L

(12) United States Patent
Mazumder et al.

(10) Patent No.: US 9,981,341 B2
(45) Date of Patent: May 29, 2018

(54) SMART ADDITIVE MANUFACTURING SYSTEM (SAMS)

(71) Applicants: Jyoti Mazumder, Ann Arbor, MI (US); Lijun Song, Ann Arbor, MI (US)

(72) Inventors: Jyoti Mazumder, Ann Arbor, MI (US); Lijun Song, Ann Arbor, MI (US)

( * ) Notice: Subject to any disclaimer, the term of this patent is extended or adjusted under 35 U.S.C. 154(b) by 267 days.

(21) Appl. No.: 14/834,806

(22) Filed: Aug. 25, 2015

(65) Prior Publication Data
US 2016/0052086 A1 Feb. 25, 2016

Related U.S. Application Data

(60) Provisional application No. 62/041,274, filed on Aug. 25, 2014.

(51) Int. Cl.
| | | |
|---|---|---|
| B23K 26/342 | (2014.01) | |
| B23K 26/03 | (2006.01) | |
| B29C 67/00 | (2017.01) | |
| B23K 31/12 | (2006.01) | |
| B33Y 50/02 | (2015.01) | |

(52) U.S. Cl.
CPC ......... B23K 26/032 (2013.01); B23K 26/342 (2015.10); B23K 31/125 (2013.01); B29C 67/0088 (2013.01); *B33Y 50/02* (2014.12)

(58) Field of Classification Search
USPC .......... 219/121.6–121.86; 700/118–120, 166
See application file for complete search history.

(56) References Cited

U.S. PATENT DOCUMENTS

| | | | |
|---|---|---|---|
| 6,122,564 A | 9/2000 | Koch et al. | |
| 6,479,168 B2 | 11/2002 | Mazumder et al. | |
| 6,940,037 B1* | 9/2005 | Kovacevic | B23K 9/044 219/121.45 |
| 6,995,334 B1* | 2/2006 | Kovacevic | B23K 26/032 219/121.63 |
| 7,820,939 B2 | 10/2010 | Mazumder et al. | |

(Continued)

OTHER PUBLICATIONS (Author unknown) A third industrial revolution, *Economist*, Apr. 21, 2012 http://www.economist.com/printedition/2012-04-21.

(Continued)

*Primary Examiner* — Samuel M Heinrich
(74) *Attorney, Agent, or Firm* — John G. Posa; Belzer PC

(57) ABSTRACT

An additive manufacturing process is monitored, in situ, using optical emission spectroscopy to analyze the composition, phase transformation or manufacturing defects. The system or method may include an analysis of contours of the plasma line intensity, or pre-processing of the plasma spectral line including signal-to-noise ratio analysis, baseline removal, line identification, line de-convolution and fitting. Improvements may additionally involve consideration of plasma parameters such as plasma spectral line intensity, line ratio, plasma temperature and electron density using high-resolution optical emission spectroscopy in both visible and ultraviolet regions. Parameters of the plasma may be determined using an intensity ratio of the ions or atoms emission lines, a FWHM of the line profile for electron density estimation, or a Boltzmann plot for plasma temperature estimation. One or more techniques may be used to monitor when there is a lack of deposition.

8 Claims, 5 Drawing Sheets

(56) References Cited

U.S. PATENT DOCUMENTS

| | | |
|---|---|---|
| 8,164,022 B2 | 4/2012 | Mazumder et al. |
| 2015/0165693 A1* | 6/2015 | Sagoo ................. B29C 67/0088 419/10 |
| 2016/0236279 A1* | 8/2016 | Ashton ................. B22F 3/1055 |

OTHER PUBLICATIONS

Mazumder, J. et al., Direct materials deposition: designed macro and microstructure, *Materials Research Innovations*, 3(3): 118-131, 1999.

Mazumder, J. et al., Closed Loop Direct Metal Deposition, Art to Part, *Special Edition on Laser Free Form Fabrication/Laser Material Processing of Journal of Optics & Laser Engineering (JOLE), OLEN*, 34: 397-414, 2000.

\* cited by examiner

US 9,981,341 B2

SMART ADDITIVE MANUFACTURING SYSTEM (SAMS)

REFERENCE TO RELATED APPLICATION

This application claims priority to U.S. Provisional Patent Application Ser. No. 62/041,274, filed Aug. 25, 2014, the entire content of which is incorporated herein by reference.

FIELD OF THE INVENTION

This invention relates generally to additive manufacturing processes wherein a laser heated melt pool solidifies to form a layered structure and, in particular, to improvements in such processes, including in situ monitoring using optical emission spectroscopy to analyze the composition, phase transformation or manufacturing defects

BACKGROUND OF THE INVENTION

Additive Manufacturing (AM) has been hailed as the "third industrial revolution" by Economist magazine (April 2012). Additive Manufacturing (AM) builds up a material to suit the service performance in a layer by layer or even pixel by pixel with appropriate materials to match the performance, which will enhance the productivity and thus reduce energy consumption. Flexibility and capability of producing near net shape critical components directly from Computer Aided Design (CAD) is partly responsible for its attraction.

There is wide spectrum of processes under the umbrella of Additive manufacturing. For metallic components two main types are: Powder bed based processes such as Selective Laser Sintering (SLS) and pneumatically delivered powder based processes such as Direct Metal Deposition (DMD). Both processes have their relative strength and weaknesses. One common problem is that postmortem quality assurance is not adequate. However, on line diagnostics and process control has the tremendous potential to reduce waste, cost and conserve energy. This offers a unique opportunity to take corrective action during AM—layer by layer, if not pixel by pixel.

SUMMARY OF THE INVENTION

This invention resides in improvements to additive manufacturing processes of the type wherein a laser heated melt pool solidifies to form a layered structure. In accordance with one preferred embodiment, the process is monitored, in situ, using optical emission spectroscopy to analyze the composition, phase transformation or manufacturing defects. The invention may include an analysis of contours of the plasma line intensity, or pre-processing of the plasma spectral line including signal-to-noise ratio analysis, baseline removal, line identification, line de-convolution and fitting.

The invention may additionally involve consideration of plasma parameters such as plasma spectral line intensity, line ratio, plasma temperature and electron density using high-resolution optical emission spectroscopy in both visible and ultraviolet regions. Parameters of the plasma may be determined using an intensity ratio of the ions or atoms emission lines, a FWHM of the line profile for electron density estimation, or a Boltzmann plot for plasma temperature estimation.

In an alternative preferred embodiment, one or more techniques may be used to monitor when there is a lack of deposition. The laser beam may be more scattered so that the laser power density on the substrate is lower than that in normal working conditions.

DETAILED DESCRIPTION OF THE INVENTION

Figure 1:
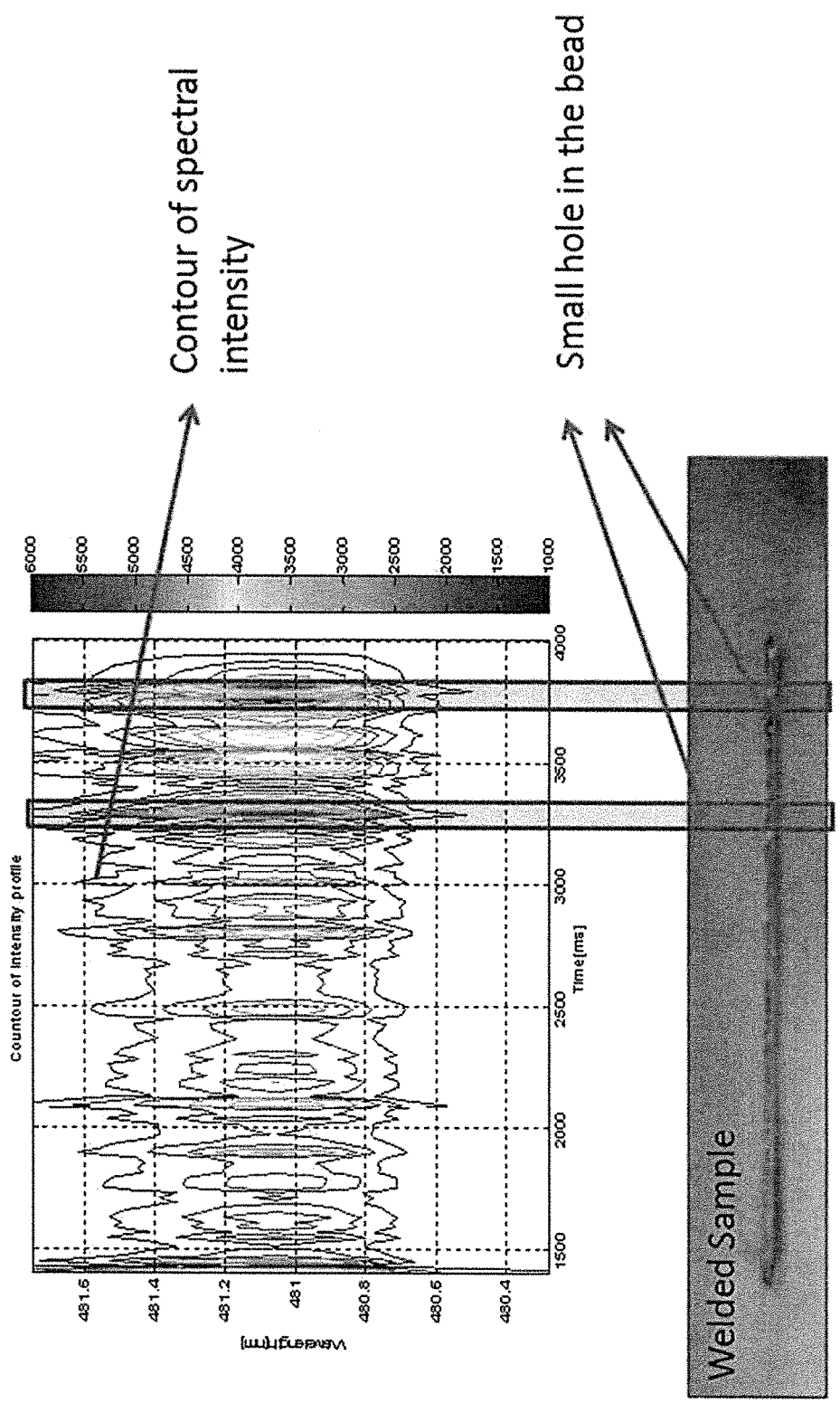
FIG. 1 shows a spectral correlation between the pinhole defects and the contour for the plasma line intensity for galvanized steel welding.

We will focus herein on the metallic 3-D printing such as DMD process, which already incorporates closed loop control [2-3] for deposition height. Thus, existing feedback can control the process in case of overbuilt but not under built. Present techniques also do not monitor any defect formation such as porosity, micro-cracks, composition or phase transformation. On the other hand, parts built with correct dimension but with above mentioned defects will not be acceptable either. This invention facilitates the monitoring of defects such as microvoids, cracks, composition and phase transformation, any or all of which may then serve as an input to control the DMD (and other 3-D printing) process. The result is a comprehensive, closed loop control system producing parts with proper quality assurance.

Description of the Comprehensive Diagnostics and Closed Loop Control System

Analysis of composition, microstructure and defects including pinhole, porosity, and micro-cracks during manufacturing process is of the utmost importance in manufacturing engineering due to the fact that the component performance is closely related to composition, microstructure and defects. However, current technologies such as EDS and XRF for composition analysis, optical microscopy, and SEM and TEM for microstructure analysis are all postmortem analysis that requires time and labor intensive preparation. X-ray and ultrasonic tests of the defects are either complex, expensive or lack in accuracy.

In situ sensors for many of the defects and diagnostics of composition and phase transformation are either already developed and patented or pending stage [4-8]. A short description of the capabilities of the sensors are given below. Sensing component of the in situ phase transformation is already described in the patent application (U.S. patent Ser. No. 61/354,286) [8]. This application describes a system which takes output from the sensors and uses those output(s) to control 3-D printing or DMD process to obtain defect free parts.

Fast Response Optical Sensor

A capability of determining the composition, the possible phase and manufacturing defects in real-time during multi-material component manufacturing may change the present practice of materials synthesis and provide future capability for composition and phase control in addition to product quality improvement. The capability of this sensor is in-situ monitoring the composition, phase transformation and manufacturing defects. The fast response sensor is based on optical emission spectroscopy.

Defect Detection

In AM, one of the barriers is defects formed in the layer: pinholes, porosity and micro cracks. Such defects result in different surface finish and changes melt pool dynamics. In order to measure these defects, we initiated optical spectroscopy sensors with a response time between 2 to 10 ms to monitor the process. Fundamentally, the laser induced plasma is inevitable phenomenon in laser-aided additive manufacturing. This plasma reflects the behavior of the laser-material interaction-zone. Features extracted from plasma signals based on optical emission spectroscopy can be used for defect detection.

Our preliminary results showed that pinholes generated during laser welding process can be successfully detected through the contours of the plasma line intensity. FIG. 1 shows a spectral correlation between the pinhole defects and the contour for the plasma line intensity for galvanized steel welding. Fundamentally these pin-hole defects are small holes or grooves, located in the surface of the solidification area. The pinhole defect can be base layers of the next depositions, leading to micro-cracks. Therefore, successfully detecting the defects such as pinhole in process is critical to the additive manufacturing process so that measures can be taken to correct or even stop the process to stop the propagation of the defects.

In this system, supervised machine learning algorithms such as support vector machine (SVM) can be applied with unsupervised machine learning algorithms including principle component analysis (PCA); unless the empirical data have clear features, the unsupervised algorithm can compensate it.

Even though the micro crack can be detected using various methods, including optical and electron microscopy, X-ray topographic imaging, and resonance ultrasonic vibration in other field, the adoption of these methods to AM is impossible [9] because of rough surface of each layer and the layer is blocked by the substrate or previous deposition that prevent optical signal from getting through. Therefore, we suggest a calibration process for correlating the spectral data with X-ray images of postmortem samples. On the basis of the calibration, the features will be transformed to mathematical conditions for in situ measurement of the defects.

Composition Sensor

Laser induced breakdown spectroscopy (LIBS) has been reported as a tool for element analysis of solid, liquid and gas samples. Our preliminary results showed that optical emission spectroscopy of laser induced plasma can be used to predict the chromium composition in a $CO_2$ laser aided additive manufacturing process. However, due to the fluctuation of the plasma signal generated in the process, the accuracy and the resolution of the measurement are not high enough for industrial applications. Therefore we propose to pre-process the plasma signal and use refined multiple-parameter algorithm to process the plasma emission to improve the in-situ composition analysis.

Figure 2:
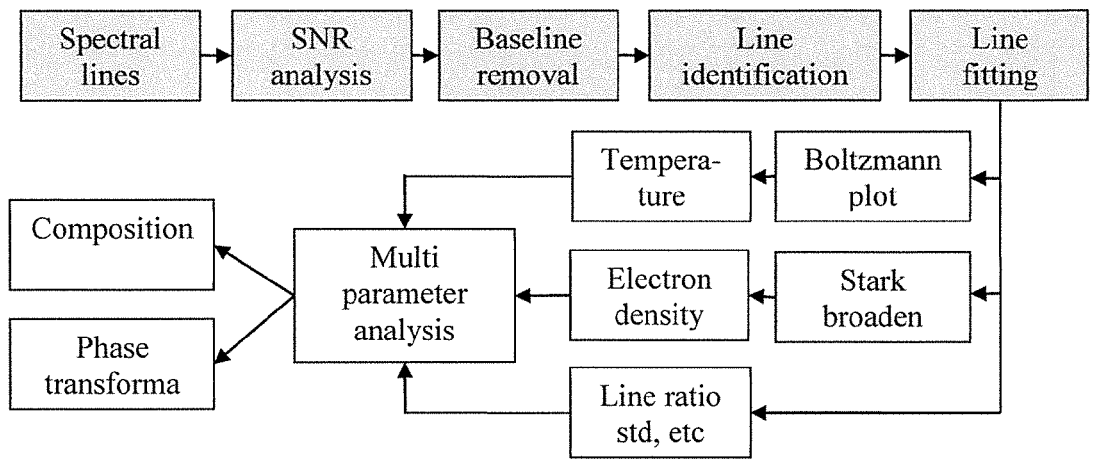
FIG. 2 shows how plasma parameters such as plasma spectral line intensity, line ratio, plasma temperature and electron density using high-resolution optical emission spectroscopy in both visible and ultraviolet regions will be performed.
Figure 3:
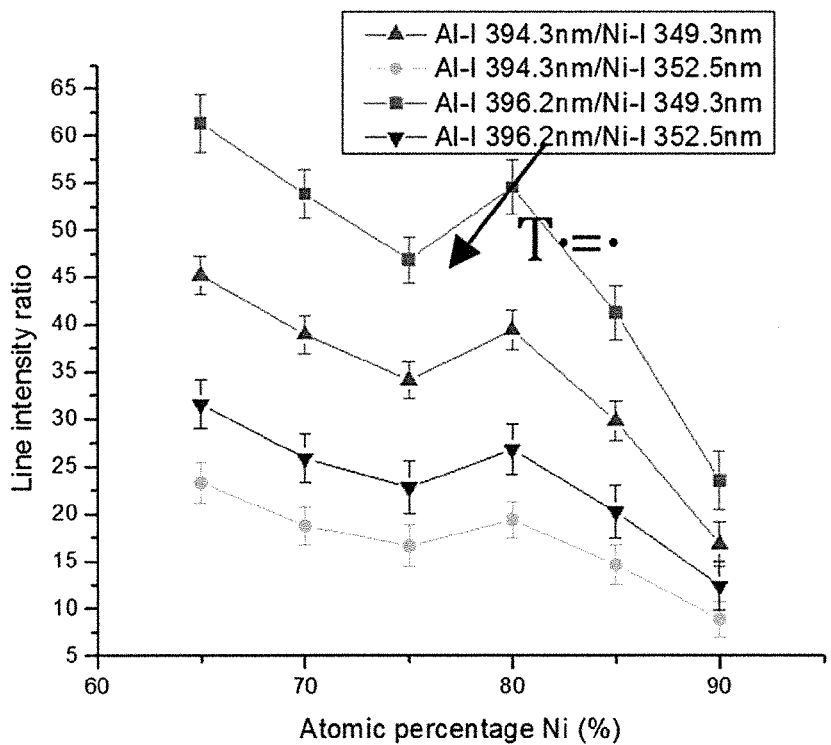
FIG. 3 illustrates one way in which parameters of plasma may be determined; namely from a Boltzmann plot for plasma temperature estimation.

Pre-processing of the plasma spectral line includes signal to noise ratio analysis, baseline removal, line identification, line de-convolution and fitting. Plasma parameters such as plasma spectral line intensity, line ratio, plasma temperature and electron density using high-resolution optical emission spectroscopy in both visible and ultraviolet regions will be performed (FIG. 2). The parameters of plasma will be determined in several ways: using an intensity ratio of the ions or atoms emission lines, using a FWHM of the line profile for electron density estimation, or from a Boltzmann plot for plasma temperature estimation as shown in FIG. 3.

Multi-parameter analysis considering line intensity, line intensity ratio from different elements, plasma temperature and electron density will be used as a calibration standard to predict the composition of each elements during manufacturing process. This calibration standard will then be utilized in real time to predict the composition of manufactured part with a resolution as high as the diameter as the last beam and as fast as 2 to 10 milliseconds. The prediction results will be validated from EDAX analysis to verify the accuracy and the resolution of the optical sensor.

Phase Transformation Sensor

Our preliminary results show that the line intensity ratio between the spectral lines from two different elements is proportional to the composition of materials within the same phase in additive manufacturing process; where there is a phase change, this linear relationship is broken and a new linear relationship is formed within the new phase. This phenomenon provides us an opportunity to spy the possible phase change during manufacturing process. However, this abnormal change of the calibration curve due to phase change will make both composition prediction and phase transformation prediction difficult. Therefore, a basic understanding of how phase transformation affect the laser induced plasma should be performed and an algorithm to de-convolve the composition and phase transformation should be developed.

It has been well known from electron theories that both the composition of metal alloy mixture and the crystal/cluster structures affect the electron structure of the crystal. In order to understand how phase transformation affect laser induced plasma, we propose to initiate a theoretical model based on the change of the electron structures where the phase transformation occurs. For transitional elements, a good start will be the significant hybridization between d state and s-p state. Since different microstructure has different crystal structure, thus different electron structure, when laser interact with the material with different microstructure, the corresponding electron structure can be reflected to the spectral radiation. This can in a way interpret the matrix effect originated from the microstructure.

Figure 4:
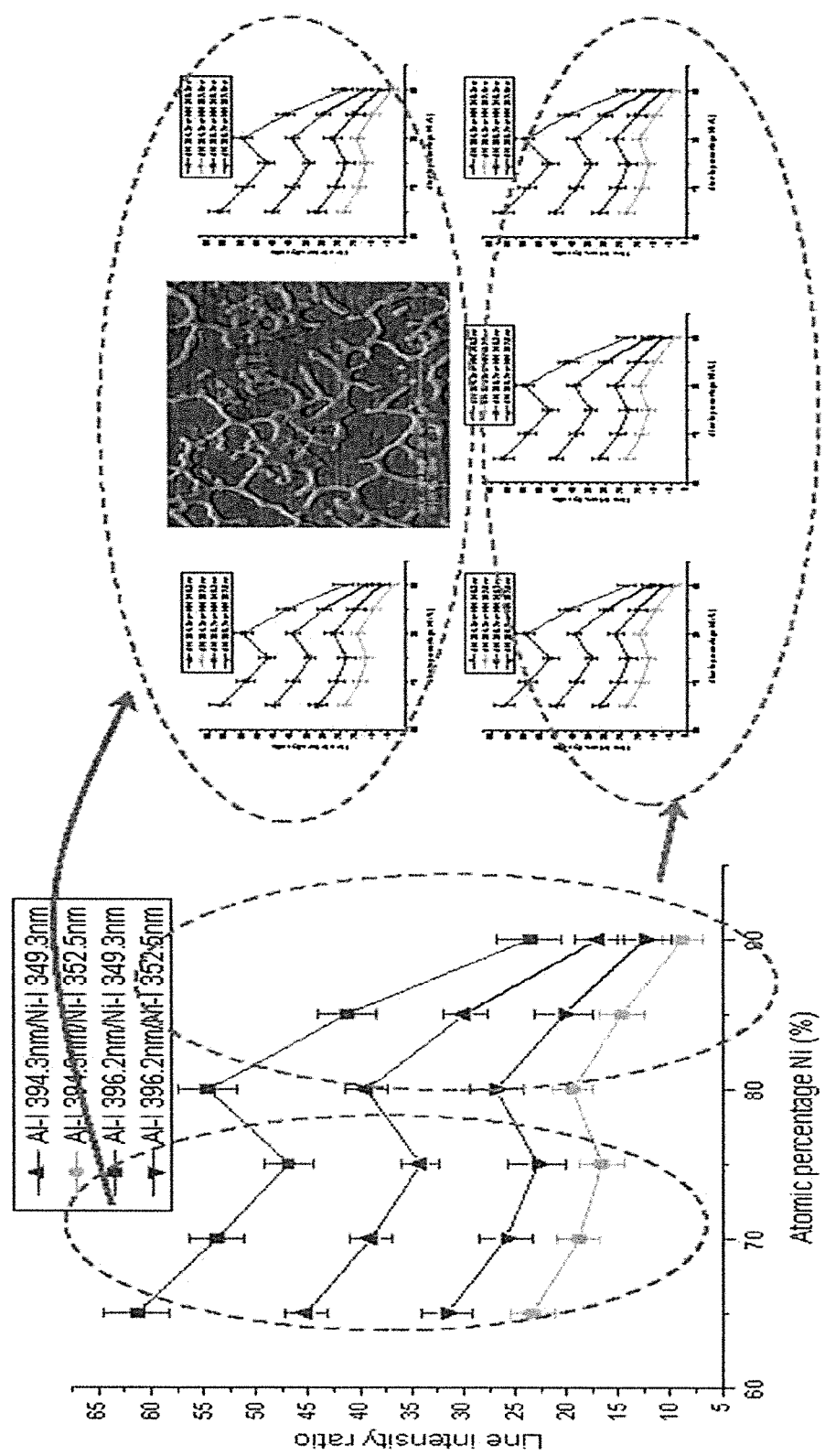
FIG. 4 shows how a simple line intensity ratio may be used as an input to predict both composition and phase transformation for Ni—Al system.

Based on the understanding on the mechanism how different composition and phase transformation affect the characterization of the plasma, a correlation between the spectroscopic signal to the composition and microstructure will be constructed systematically. For this task, we use an algorithm for de-convolving the plasma signals to predict composition using calibration curve method and to predict phase transformation using pattern recognition. Our preliminary algorithm uses simple line intensity ratio as the input to predict both composition and phase transformation for Ni—Al system is shown in FIG. 4. Composition can be obtained from a calibration curve within same phase as in each circle; microstructure can be obtained from the abruptly slope change of the line intensity ratio, as in different circles.

Since composition is a quantized value and microstructure is a categorized value, two kinds of information will be de-convolved from the plasma signal. Composition prediction took advantage of calibration curve method, while microstructure was characterized by pattern recognition method or vector classification method. Within the same microstructure, the grain size will be further calibrated by characterizing the plasma signal. The composition and microstructure of the manufacture part will be characterized using Scanning Electron Microscopy (SEM), Energy Dispersive Spectrometers (EDS), respectively for validation and prediction from plasma signal.

Closed Loop Control of Additive Manufacturing Using SOMS

Figure 5:
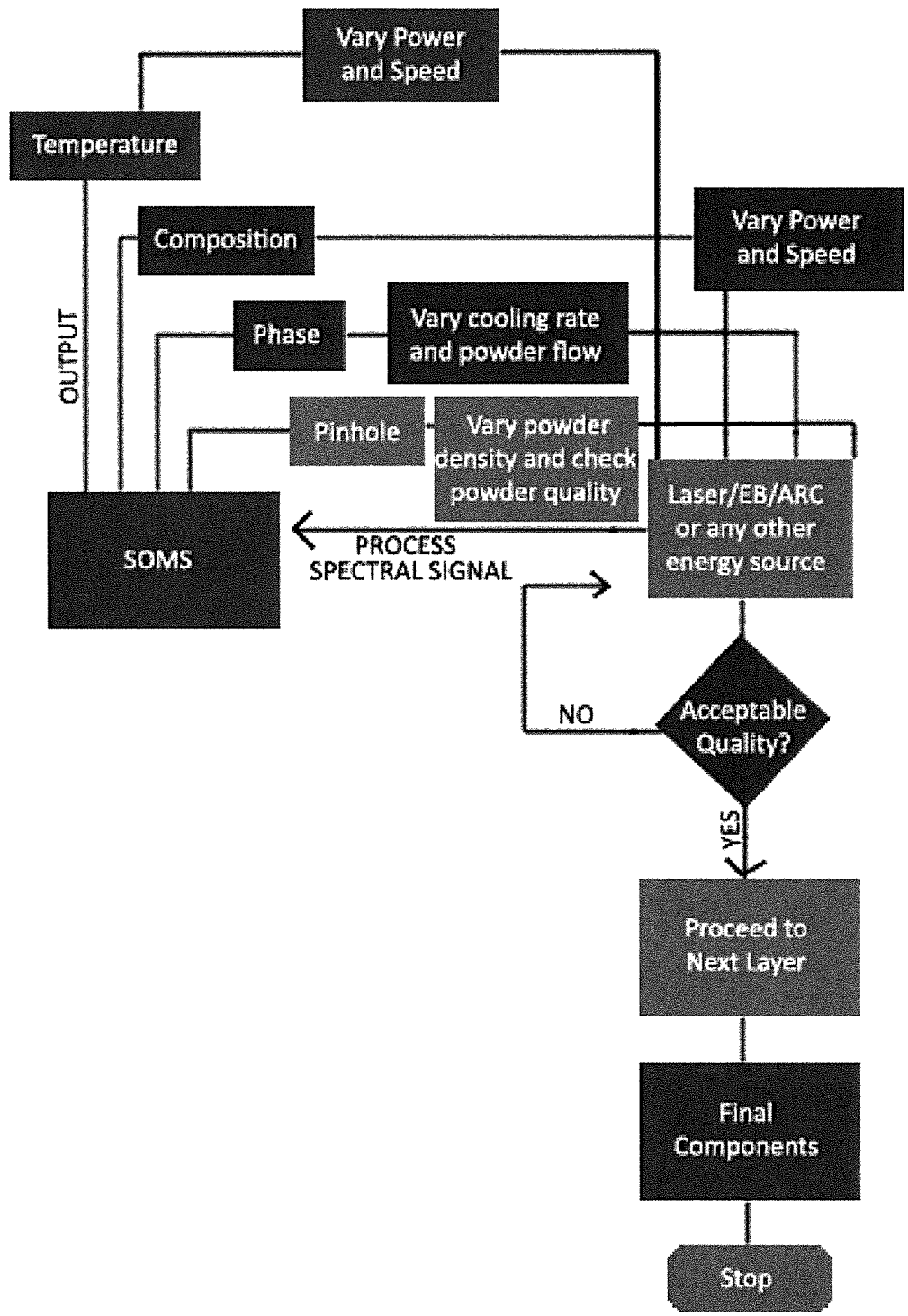
FIG. 5 depicts the incorporation of the output signal from the SOMS for process control of AM.

In order to avoid defects and provide high quality parts by additive manufacturing, we will incorporate the output signal from the SOMS and use it for process control for AM. FIG. 5 illustrates the methodology.

Figure 6A:
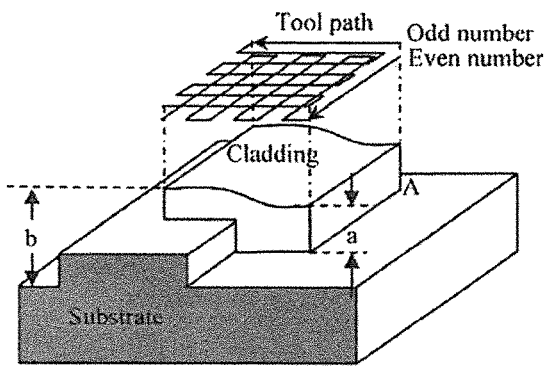
FIG. 6A shows a deposition geometry.
Figure 6B:
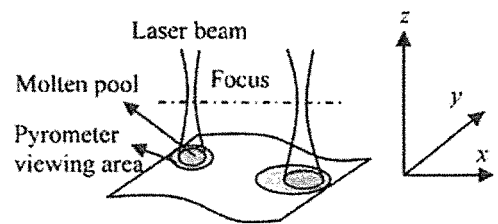
FIG. 6B illustrates the detection of melt pool temperature on uneven surface placing the substrate further away from the focusing point.

Lack of deposition and excessive deposition are two major problems that cause the dimensional inaccuracy in laser based direct metal deposition process. Tool path design, over heat input, and disturbance from the process itself or from environment may result in the overbuilt or lack of deposition. Overbuilding has been solved successfully by using a closed-loop controller using high-speed cameras or photodetectors [2,10]. However, lack of deposition is still a problem in cladding and additive manufacturing process. During laser cladding process, the laser beam is normally defocused onto the substrate. FIGS. 6A and 6B are schematic diagrams of cladding exhibiting a lack of deposition. FIG. 6A shows a deposition geometry, and FIG. 6B illustrates the detection of melt pool temperature on uneven surface placing the substrate further away from the focusing point.

When there is a lack of deposition, the laser beam is more scattered so that the laser power density on the substrate is lower than that in normal working conditions, as shown in FIG. 6B. In this case, lower melt pool temperature is expected. Moreover, since the sensor is viewing the melt pool at a 45 degree angle, there will be mismatch between the sensor/pyrometer viewing area and the melt pool area. In order to eliminate the effect of this mismatch on the detected melt pool temperature, the pyrometer viewing area is chosen to be able to cover the melt pool area even when there is a lack of deposition. Therefore, the measured temperature from the melt pool will reflect the degree of lack of deposition. When the detected melt pool temperature is below the nominal temperature, a closed-loop controller will increase the laser power so that more powders can be deposited on to the substrate to compensate for the lack of deposition. A further enhancement correlates the Abel inverted plasma temperature from spectroscopic sensor (SOMS) which will avoid some of the problem of uneven surface induced variation.

Figure 7:
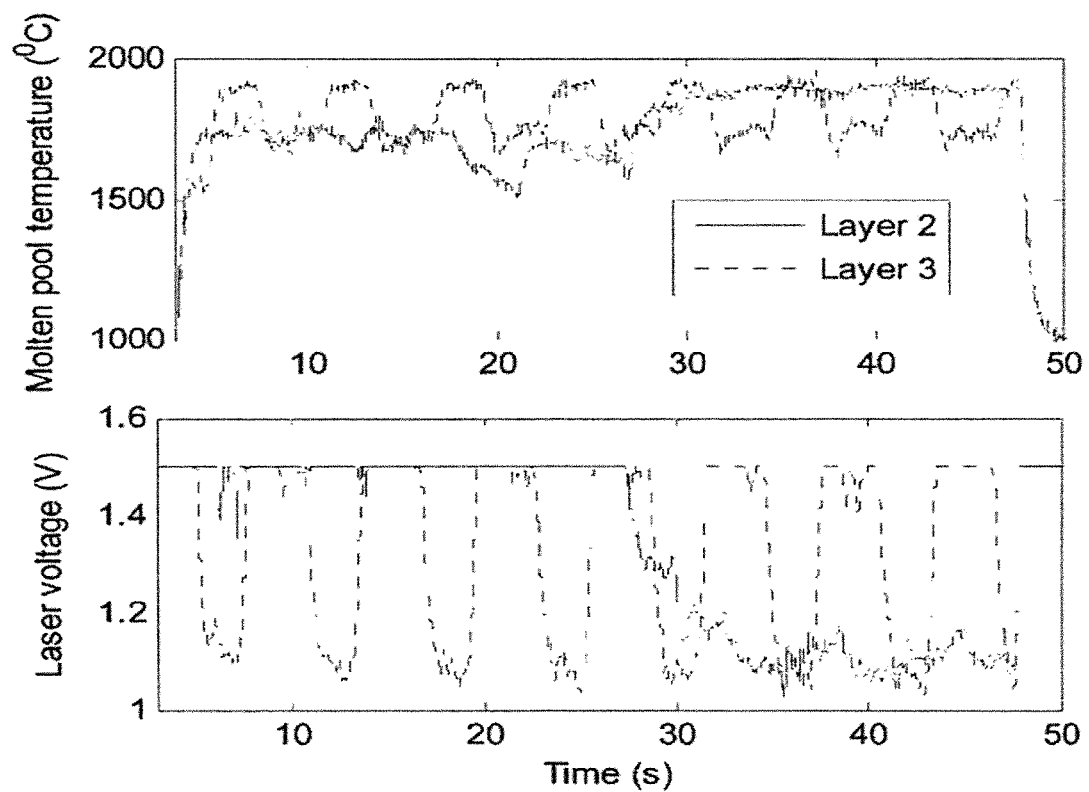
FIG. 7 shows the measured melt pool temperature and the action of the laser control voltage during laser cladding of the second and third layers.

FIG. 7 shows the measured melt pool temperature and the action of the laser control voltage during laser cladding of the second and third layers. During the first half period of the second layer, laser cladding was off the step, as shown in FIG. 6A, and a low averaged melt pool temperature was observed. The controller generated a high driving voltage to the laser to compensate for the low measured temperature. The maximum obtained melt pool temperature off the step was limited by the upper limitation of the laser power constrained by the controller. During the second half of the deposit period, laser cladding was on the step, where high melt pool temperature was detected and a low laser power was required in this case. For the third layer, the laser scanned the lower and higher parts of the substrate periodically. Therefore, the measured temperature changed periodically with equal duty cycles for both the on and off step. The controller generated a periodically changed laser driving voltage to compensate for the temperature changes. Similar variations of laser parameters such as power, speed, beam diameter and powder flow rate can be considered as a function of dependent variables such as composition, phase transformation and defects. The continuous information exchange between the SOMS and the deposition system and corrective action creates a superior additive manufacturing system which will produce quality assured parts.

Moreover, basic science developed for this system will also be applicable to powder bed type techniques where light is generated during the process.

REFERENCES

1. A third industrial revolution, Economist, Apr. 21, 2012 http://www.economist.com/printedition/2012-04-21
2. U.S. Pat. No. 6,122,564, "Apparatus and methods for monitoring and controlling multi-layer laser cladding," J. Koch and J. Mazumder, Sep. 19, 2000
3. Mazumder, J., Schifferer, A., Choi, J., "Direct materials deposition: designed macro and microstructure", *Materials Research Innovations*, Vol. 3 (3), 118-131, 1999.
4. U.S. Pat. No. 6,479,168, "Alloy Based Laser Welding," Inventors: J. Mazumder, A. Dasgupta, M. Bembenek. Nov. 12, 2002.
5. U.S. Pat. No. 7,820,939, "Zero-Gap Laser Welding." Inventor: J. Mazumder, A. Dasgupta, Oct. 26, 2010.
6. U.S. Pat. No. 8,164,022 entitled "Optical sensor for quality monitoring of a welding process"
7. U.S. patent Ser. No. 12/623,249 entitled "Monitoring of welding process" filed on Nov. 20, 2009.
8. U.S. patent Ser. No. 61/354,286 entitled "In-situ identification and control of microstructure produced by phase transformation of a material," Jun. 14, 2011.
9. Mazumder, J., Dutta, D., Kikuchi, N., & Ghosh, A. "Closed Loop Direct Metal Deposition, Art to Part", *Special Edition on Laser Free Form Fabrication/Laser Material Processing of Journal of Optics & Laser Engineering (JOLE), OLEN,* 34, 2000, 397-414.

The invention claimed is:

1. In an additive manufacturing process wherein a laser beam having a power density is used to heat a material to form a melt pool that solidifies to form a layered structure, and wherein a plasma is generated in a zone where the laser interacts with the material, the improvement comprising:
monitoring the plasma, in situ, using optical emission spectroscopy to generate one or more plasma spectral lines; and
analyzing the plasma spectral lines to determine the composition, phase transformation or manufacturing defects of the layered structure.

2. The improvement of claim 1, including an analysis of contours of plasma line intensity.

3. The improvement of claim 1, including pre-processing of the plasma spectral lines using one or more of the following:
   signal to noise ratio analysis,
   baseline removal,
   line identification,
   line de-convolution, and
   fitting.

4. The improvement of claim 1, wherein the analysis includes one or more of the following parameters of the plasma:
   plasma spectral line intensity,
   line ratio,
   plasma temperature, and
   electron density.

5. The improvement of claim 4, wherein the parameters of the plasma are determined using one or more of the following techniques:
   an intensity ratio of the ions or atoms emission lines,
   a FWHM of the line profile for electron density estimation, and
   a Boltzmann plot for plasma temperature estimation.

6. The improvement of claim 1, wherein the power intensity of the laser beam is reduced to determine a lack of material deposition.

7. The improvement of claim 1, wherein the optical emission spectroscopy is carried out in the visible region of the electromagnetic spectrum.

8. The improvement of claim 1, wherein the optical emission spectroscopy is carried out in the ultraviolet region of the electromagnetic spectrum.

* * * * *